United States Patent [19]
Fukui et al.

[11] Patent Number: 6,146,251
[45] Date of Patent: Nov. 14, 2000

[54] POLISHING METHOD, METHOD OF MANUFACTURING AN OPTICAL DEVICE, AND A LIQUID SUSPENSION USED FOR POLISHING

[75] Inventors: Tatsuo Fukui; Koichi Tatsuki, both of Kanagawa, Japan

[73] Assignee: Sony Corporation, Tokyo, Japan

[21] Appl. No.: 09/238,897

[22] Filed: Jan. 28, 1999

[30] Foreign Application Priority Data

Feb. 6, 1998 [JP] Japan .................................. 10-025647
Dec. 11, 1998 [JP] Japan .................................. 10-352347

[51] Int. Cl.[7] .................................................. B24B 1/00
[52] U.S. Cl. ............................................. 451/42; 451/446
[58] Field of Search ................................. 451/36, 39, 41, 451/42, 44, 58, 390, 446

[56] References Cited

U.S. PATENT DOCUMENTS 5,685,947 11/1997 Tseng et al. ........................... 156/636.1
5,709,588 1/1998 Muroyama ................................. 451/41

FOREIGN PATENT DOCUMENTS 2-133399 5/1990 Japan .

OTHER PUBLICATIONS

J.M. Bennet, et al., "Introduction to Surface Roughness and Scattering", pp. 24–27.
G.W. Fynn, et al., "Cutting and Polishing Optical and Electronic Materials", pp. 88–89, 201–202.
D. Eimerl, et al., "Optical, mechanical, and thermal properties of barium borate", J. Appl. Phys. 62(5), Sep. 1, 1987, pp. 1968–1983.
Adachi, "Optical Device Fabrication Technology, 1989", 1–2, "Optical Material and Fabrication", pp. 63–71.

*Primary Examiner*—Timothy V. Eley
*Assistant Examiner*—Dung Van Nguyen
*Attorney, Agent, or Firm*—Hill & Simpson

[57] ABSTRACT

By polishing an optical device such as β-BBO crystals using a liquid suspension comprising a fine powder of silicon oxide and a liquid lubricant of saturated hydrocarbon, satisfactory mirror face polishing can be applied to the optical device, without deteriorating the surface property while reducing occurrence of fine optical defects.

13 Claims, 4 Drawing Sheets

POLISHING METHOD, METHOD OF MANUFACTURING AN OPTICAL DEVICE, AND A LIQUID SUSPENSION USED FOR POLISHING

RELATED APPLICATION DATA

The present application claims priority to Japanese Application Nos. P10 025647 filed Feb. 06, 1998 and P10-352347 filed Dec. 11, 1998 which applications are incorporated herein by reference to the extent permitted by law.

BACKGROUND OF THE INVENTION

1. Field of the Invention

The present invention relates to a polishing method, for example, of optical crystals, a method of manufacturing an optical device and a liquid suspension used for polishing.

2. Description of Related Art

In recent years, as the wavelength of optical sources used for semiconductor lithographic or the like has become shorter, optical crystals (for example, non-linear optical device, electrooptic device and acousto-optic device) have been used in short wavelength regions such as UV-wavelength regions.

In such optical crystals, surface scattering of light incident to an optical surface is given by the following relation:

$$S=(4\pi\delta/\lambda)^2 \quad (1)$$

where S is scattering, $\delta$ is root mean square for surface roughness and $\lambda$ is light wavelength (refer to J. M. Bennet and L. Mattson, "Introduction to Surface Roughness and Scattering" pp. 25). That is, as the light wavelength become shorter, the effect of the surface roughness on the optical surface to the surface scattering increases.

Accordingly, in order to use optical crystals in a short wavelength region (for example, UV-wavelength region), it is necessary to attain smaller surface roughness compared with an optical device used in a region of a relatively long wavelength such as a visible region or an IR region. In particular, the scattering loss results in a significant problem upon wavelength conversion of a laser beam by utilizing a non-linear optical effect (for example, generation of second harmonics or third harmonics).

In the optical mirror polishing technique of the prior art for optical crystals used for lasers, a liquid suspension prepared by dispersing a fine powder, for example, of $CeO_2$ or $SiO_2$ as a polishing material into water or an aqueous solution such as an aqueous alkali solution has been used as a liquid suspension for polishing in a polishing step (refer to G. W. Fynn and W. J. Powell, "Cutting and Polishing Optical and Electronic Materials", pp. 88).

However, if crystals themselves have water solubility or deliquescence such as $\beta$-$BaB_2O_4$ crystals (BBO crystals) developed in recent years, for example, for UV-wavelength conversion, since the crystals cause deliquescence in the presence of a water soluble solvent in this method, polishing is impossible in principle (refer to D. Eimerl, et al., J. Appl. Phys., 62 (5), pp. 1968, 19879).

As a method of polishing a material with poor water resistance, there have been known, for example, a method of using a liquid suspension for polishing in which a fine alumina powder is dispersed in ethylene glycol (refer to G. W. Fynn and W. J. Powell, "Cutting and Polishing Optical and Electronic Materials", pp. 201), and a method of using a liquid suspension for polishing in which diamond is dispersed in glycerine (refer to Japanese Patent Unexamined Publication Hei 2-1333999).

However, the methods described above often result in micro-scratches to the surface of the material to be polished (optical crystals). Such micro-scratches, as fine defects on the optical surface (hereinafter sometimes referred to as optical defects), would lower the destruction threshold of optical crystals to incident light, can not increase the optical density of the incident light in application and, further, give hindrance to the application uses for high optical density and high power lasers. Further, the micro-scratches form latent flaws in the steps with heating such as vapor deposition or annealing after mirror polishing, which developed on the optical surface of the device to give undesired effects on the device characteristics (refer to Adachi "Optical Device Fabrication Technology, 1989", 1–2 "Optical Material and Fabrication", pp. 63.

SUMMARY OF THE INVENTION

The present invention has been accomplished in view of the foregoing situations in the prior art and an object of the invention is to provide a polishing method capable of obtaining a satisfactory surface property even for deliquescent crystals while suppressing occurrence of optical defects such as micro-scratches, as well as a method of manufacturing an optical device.

Another object of the present invention is to provide a liquid suspension used for polishing, which is used preferably in the polishing method and the method of manufacturing the optical device as described above.

In accordance with the present invention, the foregoing object can be attained by a polishing method of polishing a material to be polished with a liquid suspension comprising a fine powder of silicon oxide and liquid lubricant of a saturated hydrocarbon (hereinafter referred to as the polishing method of the present invention).

In the polishing method of the present invention, since a material to be polished such as optical crystals is polished by a liquid suspension used for polishing comprising a fine powder of silicon oxide having a hardness and a shape suitable to polishing and a saturated hydrocarbon liquid lubricant having a satisfactory lubricating effect also to a material to be polished with poor water resistance, a material having a good surface property can be obtained for the material to be polished, even if it is deliquescent crystals, without deteriorating the surface property while suppressing occurrence of optical defects such as micro-scratches.

Further, the present invention also provides a method of manufacturing an optical device comprising:

a step of cutting out a material used for an optical device into a predetermined shape and a step of polishing an optical surface formed by the cutting out step with a liquid suspension comprising a fine powder of silicon oxide and a liquid lubricant of saturated hydrocarbon (hereinafter referred to as a manufacturing method of the present invention).

According to the manufacturing method of the present invention, since the material for the optical device is cut out into a predetermined shape and then the thus formed optical surface is polished by the liquid suspension used for polishing comprising a fine powder of silicon oxide having a hardness and a shape suitable to polishing and a liquid lubricant of saturated hydrocarbon having a satisfactory lubricating effect also to a material to be polished with poor water resistance, an optical device having an optical surface with good surface property can be obtained for the material to be polished, if it is deliquescent crystals, without deteriorating the surface property while suppressing occurrence of optical defects such as micro-scratches.

Further, the present invention provides a liquid suspension used for polishing comprising a fine powder of silicon oxide and a liquid lubricant of saturated hydrocarbon as the liquid suspension for polishing suitable to use in the polishing method of the present invention and the manufacturing method of the present invention (hereinafter referred to as the liquid suspension used for polishing of the present invention).

Since the liquid suspension used for polishing of the present invention comprises a fine powder of silicon oxide having a hardness and a shape suitable to polishing and a liquid lubricant of saturated hydrocarbon having a satisfactory lubricating effect also to a material to be polished with poor water resistance, satisfactory polishing is applied also in a case of polishing deliquescent crystals, without deteriorating the surface property while suppressing occurrence of optical defects such as micro-scratches.

The "material to be polished" includes optical crystals such as $\beta$-BaB$_2$O$_4$ and LiB$_3$O$_5$, as well as optical glass or amorphous material, or compound semiconductor and silicon.

DESCRIPTION OF THE PREFERRED EMBODIMENTS

In the polishing method of the present invention, the manufacturing method of the present invention and the liquid suspension used for polishing of the present invention (hereinafter referred to collectively as the present invention), the optical surface in the optical crystals as the material to be polished can be polished by using the silica powder as the fine powder of silicon oxide.

The silica powder comprises, particularly, a fine powder of SiO$_2$, which is of a spherical shape and has a relatively soft Mohs hardness 7 as the fine powder for polishing (polishing material). It is considered that the powder has an amorphous property. It is desirable that the fine powder of silicon oxide of the present invention, including the silica powder, has a Mohs hardness of 6 or more and 7 or less (more preferably from 6.5 to 7.0). If the Mohs harness is less than 6, the polishing effect is insufficient. On the other hand, if the Mohs hardness exceeds 7, optical defects such as micro-scratches may sometimes be caused. The silica powders manufactured by Degussa Co. and Nippon Aerosil Corp. are commercially available and, generally, they can be manufactured by a flame hydrolyzing process in accordance with the reaction as shown by the following formula:

The optical crystals described above may be optical crystals used for a device selected from the group consisting of a laser wavelength conversion device, an electrooptical effect device, a magneto-optical device, a photoelastic device, a birefringence optical device and an acousto-optical effect device.

Specifically, there can be mentioned optical crystals (optical device), for example, of $\beta$-BaB$_2$O$_4$, LiB$_3$O$_5$, KH$_2$PO$_4$, KD$_2$PO$_4$ (potassium dideuterium phosphate), $\alpha$-BaB$_2$O$_4$, LiB$_4$O$_7$, CsLiB$_6$O$_{10}$, KTiOPO$_4$, KTiAsO$_4$, LiNbO$_3$, LiTaO$_3$, KNbO$_3$, Ba$_2$NaNb$_5$O$_{15}$ and K$_3$Li$_2$Nb$_5$O$_{15}$, as well as fluorides such as CaF$_2$, MgF$_2$, LiF, BaF$_2$ and NaF, and NaCl and MgO which are expected as optical materials for UV-light lasers. It is important that the optical crystals have no optical defects in the crystals and have excellent surface property in which the optical surface (surface undergoing the effect of the optical beams) is mirror polished.

Figure 4:
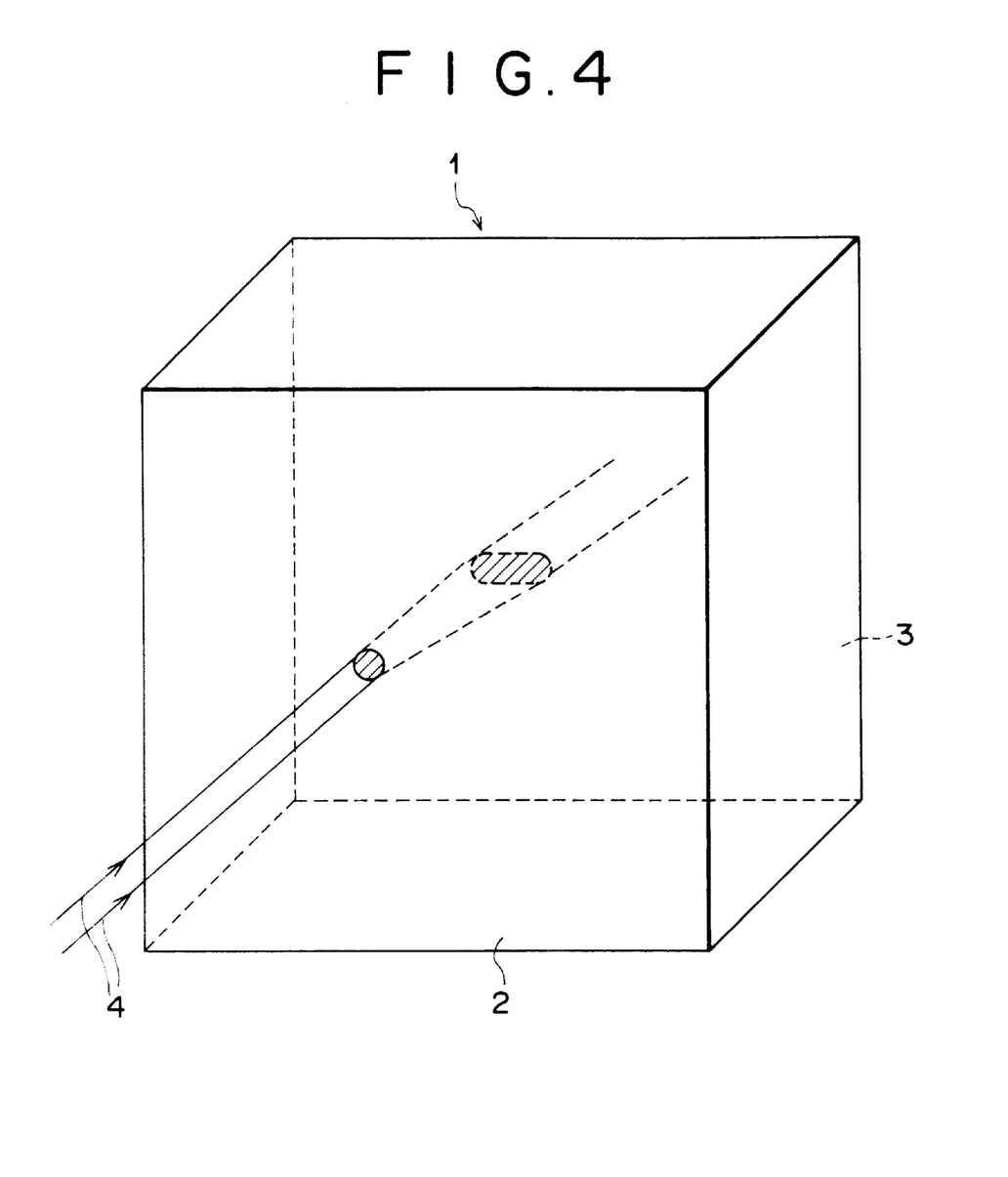
FIG. 4 is a schematic view showing the state of using non-linear optical crystals as a wavelength conversion device.

FIG. 4 shows a concrete example of applying an optical device to a laser light wavelength conversion device.

For example, when an optical beam (laser beam) 4 at 532 nm wavelength is incident to a non-linear optical crystal of $\beta$-BaB$_2$O$_4$, the optical beam incident from a light incident surface 2 propagates in a non-linear optical crystal 1, and a portion of the beam undergoes a non-linear optical effect and is subjected to wavelength conversion with walk off at 266 nm optical beam and is emitted together with the wavelength converted optical beam at 266 nm from a light emitting surface 3.

Namely, when the present invention is applied to the non-linear optical crystal used for the laser wavelength conversion device, since the surface scattering on the optical surface is suppressed, the intensity of the incident laser beam and, further, of the emitting laser beam can be maintained to obtain a laser beam at high optical density and high power.

In the present invention, the non-linear optical crystals 1 may be polished for the entire surface in accordance with the present invention but it may be polished only for the light incident surface 2 and the light emitting surface 3 as the optical surface in accordance with the present invention.

The polishing method and the liquid suspension used for polishing of the present invention are not restricted to the polishing step for optical crystals described above, but can be used also for the polishing steps of glass as the material for lens or the like, silicon as ingots or wafers, amorphous material, single crystal material and polycrystal material, for example, of compound semiconductors such as GaAs. However, such materials generally have no deliquescence and water solubility and show less reactivity to water at normal temperature. Therefore, the present invention is effective, particularly, to a situation where the presence of water should be avoided extremely in view of the characteristics of the materials and the production processes.

In the present invention, although different depending on the kind, the shape and the size of the materials to be polished, it is desirable that the average grain size of the fine powder of silicon oxide is 0.1 $\mu$m or less and, more preferably, from 7 nm (0.007 $\mu$m) to 40 nm (0.04 $\mu$m).

If the average grain size of the fine powder of silicon oxide exceeds 0.1 $\mu$m, mirror polishing for the surface to be polished (optical surface) of the material to be polished is insufficient tending to make the surface somewhat coarse.

Figure 2:
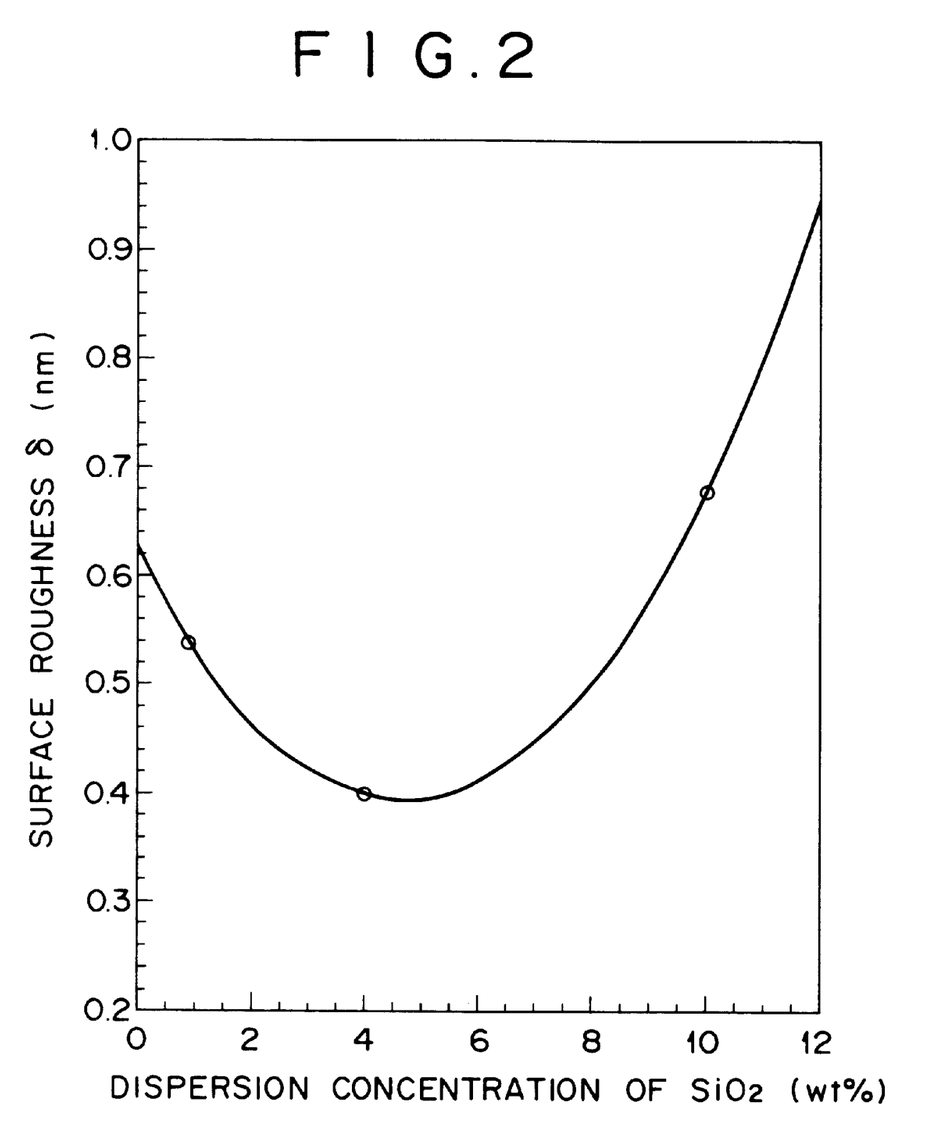
FIG. 2 is a graph showing the change of surface roughness of BBO crystals depending on the dispersion concentration of fine SiO$_2$ powder.

Further, also different depending on the kind, the shape and the size of the materials to be polished, it is desirable in the present invention that the fine powder of silicon oxide is dispersed in an amount from 1% by weight to 10% by weight based on the liquid lubricant of saturated hydrocarbon described above. More preferably, it is from 3% by weight to 7% by weight and, particularly, from 4% by weight to 5% by weight. This can be confirmed from the graph in FIG. 2 showing the change of the surface roughness (surface roughness relative to β-BBO crystals) depending on the dispersion concentration of the fine powder of silicon oxide.

If the dispersion concentration of the fine silicon oxide powder is less than 1% by weight, the mirror polishing can not be conducted thoroughly. On the other hand, if the dispersion concentration exceeds 10% by weight, the liquid suspension used for polishing tends to gel and is no more suitable to spraying.

Further in the present invention, it is desirable that the liquid lubricant of saturated hydrocarbon (hereinafter may sometimes referred to as a saturated hydrocarbon lubricant) is liquid at normal temperature and normal pressure and there can be mentioned, for example, lubricants containing at least one compound selected from the group consisting of saturated linear hydrocarbons such as $C_{10}H_{22}$ (decane), $C_{11}H_{24}$ (undecane), $C_{12}H_{26}$ (dodecane), $C_{13}H_{28}$ (tridecane) and $C_{14}H_{30}$ (tetradecane), as well as saturated cyclic hydrocarbons represented by $C_{10}H_{20}$, $C_{11}H_{22}$, $C_{12}H_{24}$ and having cyclopentane or cyclohexane in a portion thereof. More specifically, OS oil (trade name of products manufactured by Engis Co., USA, kerosene (common name of products manufactured, for example, by Kanto Chemicals Co. Inc.) can be mentioned. Particularly, mixtures of saturated hydrocarbon compounds having relatively high distillation points, among distillation products, obtained in the course of refining petroleum or those refined again from the mixtures to reduce danger or toxicity are desired.

The saturated hydrocarbon lubricant can provide satisfactory lubricating effect to highly stable materials with no deliquescence (for example, optical devices), as well as to optical crystals having deliquescence and water solubility, without deteriorating the surface property thereof and, at the same time, can disperse the fine powder of silicon oxide satisfactorily. Further, it is desirable that the lubricant has relatively high boiling point and flashing point, has characteristics capable of withstanding heat or the like during polishing and, further, have high safety.

Particularly, the solvent for dispersing the silica powder as the super-fine powdery polishing agent in the step of polishing deliquescent crystals is required to have the following properties of being:

(1) less water soluble (water is less soluble to the solvent),
(2) relatively stable and with less danger such as flashing in the working circumstance,
(3) not toxic to human bodies,
(4) relatively inexpensive and easily available, and
(5) easy to disperse the polishing agent, spray and drip.

The non-aqueous solvent generally includes, for example, saturated hydrocarbons or unsaturated hydrocarbons, alcohols containing oxygen to a portion thereof, ester, ethers, or ketones or chlorine-containing chlorinated hydrocarbons. However, the alcohols are not suitable for the condition (1) and not suitable as the solvent used for the polishing of easily water soluble and deliquescent crystals. Esters, ethers, ketones or chlorine-containing chlorinated hydrocarbons generally have high toxicity to human bodies and are not suitable for the conditions (3). Further, unsaturated hydrocarbons having double bonds or triple bonds are generally highly reactive and highly unstable and are not suitable for the conditions (2) and (3). Further, if the solvent has hydroxy groups, or double bonds or triple bonds, it is considered that they cause reduction with silanol groups (Si-OH) on the surface of the silica powder to increase the viscosity, so that it is difficult to satisfy the condition (5).

On the contrary, the saturated hydrocarbons are generally classified into linear hydrocarbons and cyclic hydrocarbons, both of which can satisfy the characteristics shown in (1), (2) and (3), particularly, in the case of compounds having relatively large molecular weight (with about 10 or more carbon atoms). Further, if the condition (4) is taken into consideration, the materials described specifically above are mentioned and they can also satisfy the condition (5).

In the present invention, the liquid suspension used for polishing is desirably used in the mirror polishing step (finishing polishing step) to the optical surface, and the mirror polishing step can provide an optical surface with highly mirror finished surface with small surface roughness and having satisfactory surface property with reduced surface scattering. Accordingly, even if a treatment with heating such as vapor deposition or annealing is applied to the optical surface, undesired effects caused by the optical defects (latent flaws or micro-scratches) can be minimized.

Then, the mirror polishing step according to the present invention is to be explained with reference to FIG. 1.

Figure 1:
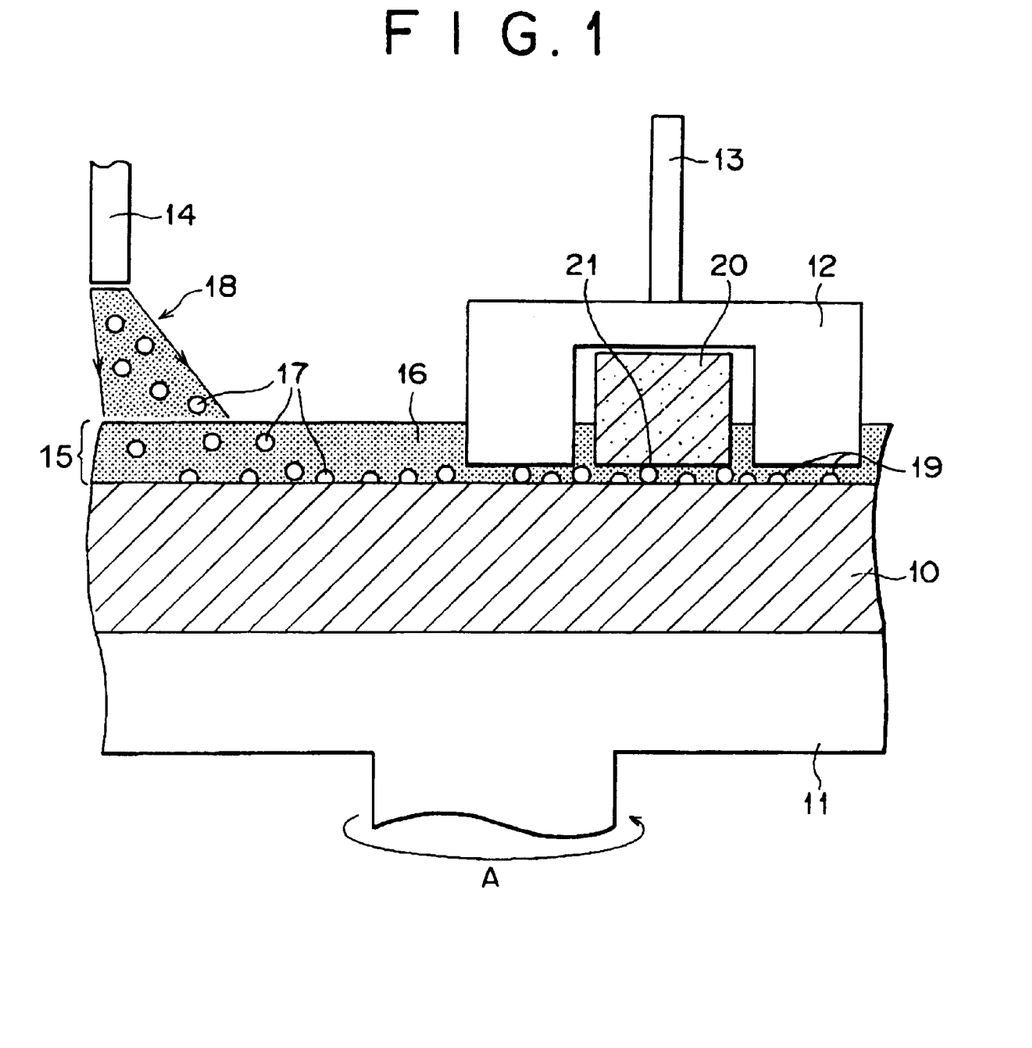
FIG. 1 is a schematic view of a polishing apparatus usable in a mirror polishing step in the present invention.

FIG. 1 shows a polishing apparatus usable for a mirror polishing step, in which (porous) polishing disc prepared by bonding a powdery metal (for example, tin) with a resin, for example, a HY tin disc (manufactured by ENGIS Co.) 10 is set to a rotary polishing plate 11 by means of screws or the like, and the rotary polishing plate 11 and the polishing disc 10 are adapted to rotate in a certain direction, for example, as shown by an arrow A in the drawing and at a certain number of rotation (for example, 10 to 30 rpm, preferably, at about 20 rpm) by an electric motor or the like. Further, a liquid suspension spray nozzle 14 is disposed above the polishing disc 10, and a liquid suspension 18 is sprayed (discharged) from the liquid suspension spray nozzle 14 by an air pressure at an appropriate period (for example, about 1 to 2 sec for every 120 to 180 sec periods) onto the upper surface of the polishing disc 10.

The liquid suspension 18 is a liquid suspension in which silica powder 17 is dispersed in a saturated hydrocarbon lubricant 16 in accordance with the characteristic constitution of the present invention (liquid suspension used for polishing), and the liquid suspension 18 discharged from the liquid suspension spray nozzle 14 forms a liquid suspension layer 15 on the polishing disc 10. The silica powder 17 is homogeneously disperse in the liquid suspension layer 15 and is partially buried to the surface of the polishing disc 10 during operation thereof to form semi-liberated polishing grains (semi-fixed polishing grains) 19 for mirror polishing the optical surface 21 of the material to be polished (polished material) such as an optical crystal device.

Further, the lubricant 16 in the liquid suspension layer 15 forms liquid suspension layer 15 of a predetermined thickness by the surface tension thereof on the surface of the polishing disc 10 and has a function of smoothing the sliding contact between the polishing disc 10 and the material to be polished 20 or the fixing holder 12 during polishing and suppressing heat generation during polishing.

The polished material 20 is fixed to the fixing holder 12 by means of an adhesive material that can be peeled easily under the effect of heating or the like, and the fixing holder 12 is independent of the rotary motion of the rotary polishing plate 11 and the polishing disc 10 by a fixing holder support arm 13. As a result, a sliding motion is caused between the silica powder 17 or the semi-liberated polishing grain 19 of the silica powder and the polished material 20 such as the optical crystal device, thereby causing polishing to the polished material 20.

As described above, according to the present invention, since the optical crystal device or the like is polished by using the liquid suspension for polishing comprising the silica powder having a hardness and a shape suitable to the mirror polishing and the saturated hydrocarbon lubricant exhibiting the satisfactory lubricating effect also to a material of poor water resistance, an optical crystal device having satisfactory optical surface can be obtained, even if is deliquescence crystals (for example, β-BBO crystals), without deteriorating the surface property while suppressing optical defects.

There is no particular restriction on the disc used in the mirror polishing step and, for example, a tin disc can be used suitably, in which the pressure for the treatment and number of rotation of the disc can be set properly.

The effect of the present invention will be explained next.

It is considered that a satisfactory optical mirror face can be prepared by the polishing method using the silica powder as the polishing material, because the Mohs hardness of the silica powder is relatively small as 7 compared with the Mohs hardness 10 of diamond, and the silica powder is a polishing material having an appropriate hardness to the optical crystal having a particularly fragile optical surface and, at the same time, because the silica powder is of a spherical or substantially spherical shape compared with an angled shape of diamond and has a satisfactory shape property capable of suppressing the occurrence of optical defects such as micro-scratches to the optical surface.

Further, the saturated hydrocarbon liquid lubricant mainly comprises a hydrocarbon, in view of the structure, in which all of constituting carbon skeletons are saturated with hydrogen atoms, it is less reactive also to deliquescent optical crystals and, particularly, contains no hydroxy groups in the structure. Therefore, it is considered that this liquid lubricant can provide a lubricating effect with no reaction caused by hydroxy groups even to deliquescent or water soluble optical crystals and can conduct satisfactory polishing also to crystals sensitive to water content.

EXAMPLE

The present invention is to be explained with reference to concrete example but the invention is not limited only to the following examples.

Comparative Example 1

Deliquescent β-BaB$_2$O$_4$ single crystals (β-BBO crystals) were used as the material to be polished (polished material), and after cutting out the material into a size of 5×5×5 mm using a diamond cutter, the surface was polished stepwise using diamond slurry containing fine diamond with an average grain size of 9 μm, 2 μm and 1 μm.

Then, mirror polishing was applied as final finishing by using an oily diamond slurry containing diamond with an average grain size of ¼ μm and using a HY tin disc (manufactured by ENGIS Co.) as shown in FIG. 1. The optical crystals obtained are referred to as comparative specimen A.

When the surface roughness on the polished surface was measured for the comparative specimen A by using a surface roughness measuring instrument manufactured by Zygo Co. (trade name: Maxim 3D5700), the surface roughness δ (square mean for the surface roughness) was 0.72 nm. The result was obtained by optimizing the polishing time, the processing pressure and the number of rotation of disc, and it was a limit value in this method.

Example 1

Using deliquescent β-BaB$_2$O$_4$ single crystals (β-BBO crystals) as the polished material and after cutting out the material into a size of 5×5×5 mm using a diamond cutter in the same manner as in Comparative Example 1, the surface thereof was polished stepwise using a diamond slurry containing fine diamond with an average grain size of 9 μm, 2 μm and 1 μm.

Then, in the finishing mirror polishing step, polishing as final finishing was conducted by using a liquid suspension prepared by dispersing 4% by weight of a silica powder with an average grain size of 0.01 μm in a saturated hydrocarbon liquid lubricant (OS oil type III: manufactured by Engis Co.: here and hereinafter) as the liquid suspension for polishing, with other conditions being made identical with those in Comparative Example 1. The optical crystals thus obtained are referred to as specimen 1.

When the surface roughness was measured in the same manner as described above for the specimen 1, the surface roughness δ was 0.35 nm. Further, no damages such as cloudness or dig caused by liquid suspension and moisture in air were not observed at all on the surface of the specimen by an optical microscope.

Figure 3A:
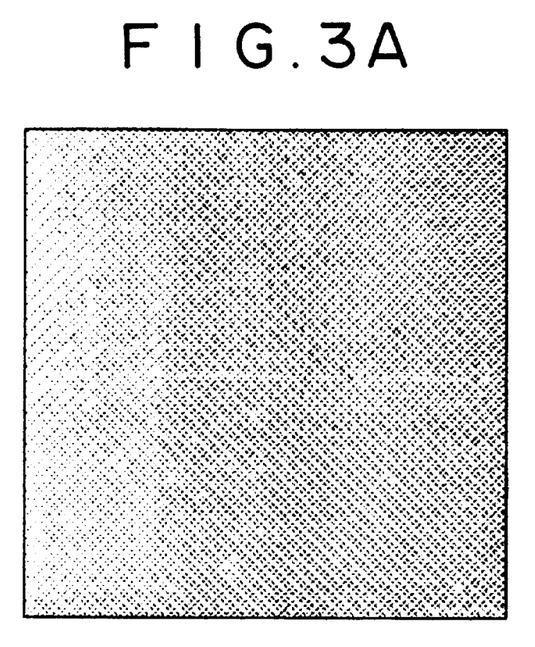
FIG. 3A is a STM Photograph showing the surface state of $\beta$-BBO crystals when polished in accordance with the polishing method of the present invention.
Figure 3B:
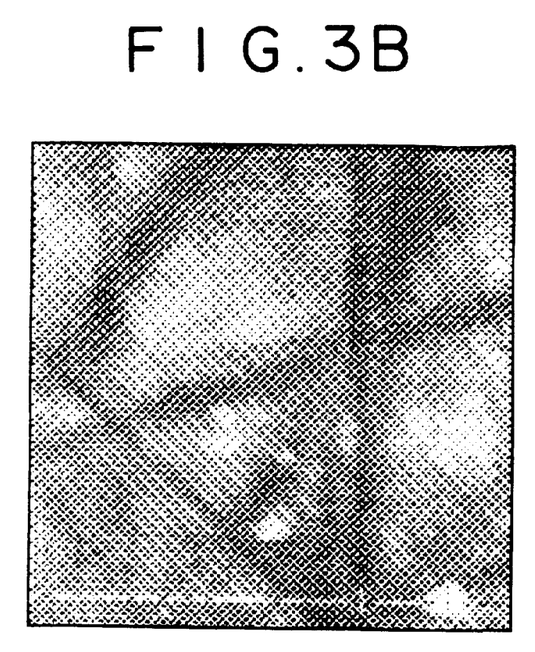
FIG. 3B is a STM Photograph (B) showing the surface state of $\beta$-BBO crystals when polished in accordance with the polishing method of the prior art.

Then, an electroconductive film of about 5 nm thickness made of Pt/Pd was formed by sputtering on the polished surfaces of the specimen 1 and the Comparative specimen A and when the surfaces were measured by a scanning type tunnel microscope (STM), a great number of micro-scratches were observed for the comparative specimen A as shown in FIG. 3B, whereas no micro-scratches were observed and a mirror-like optical surface was observed for the specimen 1 as shown in FIG. 3A.

Further, a resonator cavity for resonation of an optical beam at 532 nm wavelength was prepared and when optical loss was measured for the specimen 1 and the comparative specimen A in the cavity, the surface scattering loss was about 0.18% for the comparative specimen A, whereas the surface scattering loss was 0.05% for the specimen 1, which extremely small compared with that of the comparative specimen.

In view of the above, it can be said that the polishing method according to this example using the liquid suspension comprising the silica powder and the saturated hydrocarbon liquid lubricant as the polishing liquid is a method capable of providing a satisfactory super optical mirror face without giving damages caused by water content or the like to deliquescent optical crystals.

The saturated hydrocarbon lubricant used in this example is a compound having a specific gravity of 0.8, a boiling point from 340 to 400° F. (about 171–240° C.) and a flashing point at 130° F. (about 54° C.), which is highly stable and excellent in safety.

Example 2

Using LiB$_3$O$_5$ single crystals (LBO crystals) sensitive to moisture as the polished material and after conducting cutting and pretreatment using the diamond slurry in the same manner as in Example 1, a finishing mirror polishing step was conducted in the same manner as in Example 1 by sing, as a polishing liquid, a liquid suspension prepared by dispersing a silica powder of 0.01 μm average grain size at 4% by weight concentration into the saturated hydrocarbon liquid lubricant.

When the surface roughness was measured to the resultant optical surface in the same manner as in Example 1, the surface roughness δ was 0.4 nm. This apparently shows that the polishing method of using the liquid suspension comprising the silica powder and the saturated hydrocarbon liquid lubricant is a method capable of providing a satisfactory super-optical mirror face also to optical crystals sensitive to moisture.

Further, when the surface roughness was measured in the same manner as described above while varying the dispersion concentration of the silica powder to the saturated hydrocarbon lubricant (1.0 wt %, 10 wt %), it was confirmed that the surface roughness δ depending on the dispersion concentration of the silica powder (surface roughness of BBO crystals) was changed as shown by the graph in FIG. 2. If the dispersion concentration was less than 1% by weight, the mirror polishing was difficult, whereas if the dispersion concentration exceeded 10% by weight, the liquid suspension caused gelation to make spraying difficult. It was thus found that the dispersion concentration of the silica powder to the saturated hydrocarbon lubricant is preferably from 1% by weight to 10% by weight while this depends on the kind and the surface of the polished material. Further, considering that the mirror polishing is applied to surface roughness δ of 0.45 nm or smaller, it is desirable that the concentration is preferably from 3% by weight to 7% by weight. Further, considering that the super mirror polishing is applied to the surface roughness of 0.40 nm or smaller, it is desirable that the concentration is from 4% by weight to 5% by weight.

Example 3

Finishing mirror polishing was applied in the same manner as in Example 1 using, as a polishing liquid, a liquid suspension in which a silica powder of 0.01 μm average grain size was dispersed by 4% by weight to the saturated hydrocarbon lubricant, except for using $KTiOPO_4$ single crystals (KTP crystals) not having water solubility and deliquescence as the polished material.

When the surface roughness was measured for the resultant optical surface in the same manner as in Example 1, the surface roughness δ was 0.39 nm. From the result, it was found that satisfactory super optical mirror face can be attained also to optical crystals not having water solubility and deliquescence.

Comparative Example 2

Finishing mirror polishing was applied in the same manner as in the method described above except for using the same KTP crystals as in Example 3 as the polished material and using an oily diamond slurry containing diamond with an average grain size of ¼ μm as the polishing liquid (polishing liquid suspension) as in Comparative Example 1.

When the surface roughness was measurement in the same manner as in Example 1, the surface roughness δ was relatively large as 0.50 nm and it was found to be insufficient as the mirror polishing.

Comparative Example 3

Using the same β-BBO crystals as in Comparative Example 1 and Example 1 as the polished material, and finishing mirror polishing was applied in the same manner as in Comparative Example 1 and Example 1, except for using a liquid suspension for polishing prepared by dispersing aluminum of an grain size of 0.3 μm into ethane diol (ethylene glycol: $CH_2(OH)CH_2OH$).

When the surface roughness was measured in the same manner as in Comparative Example 1 and Example 1, the estimated surface roughness δ was several micrometer and mirror polishing was impossible.

Comparative Example 4

Using the same β-BBO crystals as in Comparative Example 1 and Example 1 as the polished material, and finishing mirror polishing was applied in the same manner as in Comparative Example 1 and Example 1, except for using a liquid suspension used for polishing prepared by dispersing aluminum with an average grain size of 0.05 μm into OS oil (trade name of products manufactured by Engis Co.).

When the surface roughness was measured in the same manner as in Comparative Example 1 and Example 1, the surface roughness δ was 0.8 nm, which can not be said to have a sufficient mirror face property, and a great number of micro-scratches were observed.

Comparative Example 5

Using the same β-BBO crystals as in Comparative Example 1 and Example 1 as the polished material, and finishing mirror polishing was applied in the same manner as in Comparative Example 1 and Example 1, except for using a liquid suspension used for polishing prepared by dispersing aluminum with an average grain size of 0.15 μm into OS oil (trade name of products manufactured by Engis Co.).

When the surface roughness measured in the same manner as in Comparative Example 1 and Example 1, the surface roughness δ was as large as 1.2 μm which can not be said to have a sufficient mirror face property, and a great number of micro-scratches were observed.

The present invention has been explained with reference to the examples but the invention is not restricted to the examples described above, and the present invention is applicable irrespective that the materials to be polished have deliquescence or not, for example, as shown in Examples 1 to 3.

Accordingly, the polished material is not restricted, for example, to β-$BaB_2O_4$, $LiB_3O_5$, $KTiOPO_4$ referred to in the examples but the invention is applicable particularly also to optical crystals generally used for the control of optical beams, specifically, $KH_2PO_4$, $KD_2PO_4$, α-$BaB_2O_4$, $LiB_4O_7$, $CsLiB_6O_{10}$, $KTiOPO_4$, $KTiOsO_4$, $LiNbO_3$, $LiTaO_3$, $KNbO_3$, $Ba_2NaNb_5O_{15}$ and $K_3Li_2Nb_5O_{15}$, and also to fluorides such as $CaF_2$, $MgF_2$, LiF, $BaF_2$ and NaF, and NaCl and MgO, which are expected as optical materials for UV-light lasers. Furthermore, it is also effective to optical materials using lenses or optical fibers.

Further, as shown in Example 1, according to the polishing method of this example, the surface roughness is improved to about ½ compared with the method using diamond as the polishing material. That is, as shown in the relation (1) above, since the optical loss caused by the surface scattering is given as a square of the ratio for the surface roughness and the incident wavelength, this example is effective to optical crystals used in the visible and the IR region, as well as remarkably effective also to optical crystals used in a shorter wavelength region than the visible and the IR wavelength region, for example, UV-light wavelength region in view of the reduction of the surface scattering loss.

Further, while the average grain size of the silica powder and the concentration of the liquid lubricant are shown in this example, they are not restricted and can be changed variously depending on the kind, the shape and the size of the material to be polished in the polishing fabrication. Further, also the disc used for the polishing step in this example is not restricted to the tin disc described above.

As has been described above, according to the example (particularly, Example 1), super optical mirror face satisfactory in view of application use can be attained for optical single crystals showing fragility to water content such as deliquescence and water solubility. Further, this is also effective for the polishing of crystal materials sensitive to moisture as shown in Example 2, and polishing of crystal materials not having water solubility and deliquescence and having water resistance as shown in Example 3. Furthermore, since no micro-scratches are formed on the optical surface of the optical crystals, it is possible for the application use of crystals at high optical density, and processing with heating after the polishing fabrication.

Further, since the surface roughness after fabrication is small, it is possible for the application of optical crystals to a short wavelength region such as UV wavelength region suffering greatly from the surface scattering. For example, it is effective to the mirror polishing to $\beta$-$BaB_2O_4$ single crystals used as a wavelength conversion device of conducting wavelength conversion, for example, from a visible light at 532 nm wavelength into a UV light at 266 nm wavelength by a secondary harmonic generation method (SHG).

According to the polishing method of the present invention, since the material to be polished such as optical crystals is polished by the liquid suspension for polishing comprising, particularly, a fine powder of silicon oxide having a hardness and a shape suitable to finishing mirror face polishing and a saturated hydrocarbon lubricant having satisfactory lubrication even to a material to be polished of poor water resistance, a material having a satisfactory surface property can be obtained even if the material to be polished is deliquescent crystals, without deteriorating the surface property while reducing occurrence of optical defects such as micro-scratches.

According to the manufacturing method of the present invention, since a material for an optical device is cut out into a predetermined shape and then the thus formed optical surface is optically polished by a liquid suspension for polishing comprising, particularly, a fine powder of silicon oxide having a hardness and a shape suitable to finishing mirror face polishing and a saturated hydrocarbon lubricant having satisfactory lubrication even to a material of poor water resistance, an optical device having an optical surface with a satisfactory surface property can be obtained even if the optical device is deliquescent crystals, without deteriorating the surface property while reducing occurrence of optical defects such as micro-scratches.

Since the liquid suspension for polishing according to the present invention comprises, particularly, a fine powder of silicon oxide having a hardness and a shape suitable to finishing mirror face polishing and a saturated hydrocarbon lubricant having satisfactory lubrication even to a material of poor water resistance, satisfactory polishing can be applied even in a case of polishing deliquescent optical crystals, without deteriorating the surface property while reducing occurrence of optical defects such as micro-scratches on the surface.

What is claimed is:

1. A polishing method of polishing an optical surface of optical crystals with a liquid suspension comprising a fine silica powder and a liquid lubricant of saturated hydrocarbon.

2. A polishing method as claimed in claim 1, wherein the optical crystals are to be used as a device selected from the group consisting of a laser wavelength conversion device, an electrooptical effect device, a magneto-optical device, a photoelastic device, a birefringence optical device and an acousto-optical effect device.

3. A polishing method as claimed in claim 1, wherein an average grain size of the fine silica powder is 0.1 $\mu$m or less.

4. A polishing method as claimed in claim 1, wherein the fine silica powder is dispersed an amount from 1% by weight to 10% by weight based on the liquid lubricant of saturated hydrocarbon.

5. A polishing method as claimed in claim 1, wherein the liquid lubricant of saturated hydrocarbon contains at least one compound selected from the group consisting of saturated linear hydrocarbons represented by $C_{10}H_{22}$, $C_{11}H_{24}$, $C_{12}H_{26}$, $C_{13}H_{28}$ and $C_{14}H_{30}$, and saturated cyclic hydrocarbons represented by $C_{10}H_{20}$, $C_{11}H_{22}$ and $C_{12}H_{24}$ and having cyclopentane or hexane as a portion thereof.

6. A polishing method as claimed in claim 1, wherein the polishing method is a step used in polishing a finishing mirror.

7. A method of manufacturing an optical device comprising:
   a step of cutting out a material used for an optical device into a predetermined shape and
   a step of polishing an optical surface formed by the cutting out step with a liquid suspension comprising a fine powder of silicon oxide and a liquid lubricant of saturated hydrocarbon.

8. A method of manufacturing an optical device as claimed in claim 7, wherein an optical surface in optical crystals as the material to be polished is polished by using a silica powder as the fine powder of silicon oxide.

9. A method of manufacturing an optical device as claimed in claim 8, wherein the optical crystals are to be used as a device selected from the group consisting of a laser wavelength conversion device, an electrooptical effect device, a magneto-optical device, a photoelastic device, a birefringence optical device and an acousto-optical effect device.

10. A method of manufacturing an optical device as claimed in claim 7, wherein the average grain size of the fine powder of silicon oxide is 0.1 $\mu$m or less.

11. A method of manufacturing an optical device as claimed in claim 7, wherein the fine powder of silicon oxide is dispersed in an amount from 1% by weight to 10% by weight based on the liquid lubricant of saturated hydrocarbon.

12. A method of manufacturing an optical device as claimed in claim 7, wherein the liquid lubricant of saturated hydrocarbon contains at least one compound selected from the group consisting of saturated linear hydrocarbons represented by $C_{10}H_{22}$, $C_{11}H_{24}$, $C_{12}H_{26}$, $C_{13}H_{28}$ and $C_{14}H_{30}$, and saturated cyclic hydrocarbons represented by $C_{10}H_{20}$, $C_{11}H_{22}$ and $C_{12}H_{24}$ and having cyclopentane or hexane as a portion thereof.

13. A method of manufacturing an optical device as claimed in claim 7, wherein the method is a step used in polishing a finishing mirror.

* * * * *